United States Patent [19]

Fasching

[11] Patent Number: 4,466,747
[45] Date of Patent: Aug. 21, 1984

[54] ASH LEVEL METER FOR A FIXED-BED COAL GASIFIER

[75] Inventor: George E. Fasching, Morgantown, W. Va.

[73] Assignee: The United States of America as represented by the United States Department of Energy, Washington, D.C.

[21] Appl. No.: 434,021

[22] Filed: Oct. 12, 1982

[51] Int. Cl.³ ............................................. G01F 23/72
[52] U.S. Cl. ................................. 374/101; 374/112; 374/142; 73/295
[58] Field of Search ............... 374/101, 102, 103, 104, 374/110, 111, 112, 116, 140, 141, 142; 73/295; 364/557

[56] References Cited

U.S. PATENT DOCUMENTS

| | | | |
|---|---|---|---|
| 3,797,310 | 3/1974 | Babcock et al. | 73/295 |
| 4,320,656 | 3/1982 | Tiskus | 73/295 |
| 4,356,728 | 11/1982 | Gomez | 73/295 |

Primary Examiner—Steven L. Stephan
Assistant Examiner—David R. Schuster
Attorney, Agent, or Firm—David E. Breeden; Stephen D. Hamel; Michael F. Esposito

[57] ABSTRACT

An ash level meter for a fixed-bed coal gasifier is provided which utilizes the known ash level temperature profile to monitor the ash bed level. A bed stirrer which travels up and down through the extent of the bed ash level is modified by installing thermocouples to measure the bed temperature as the stirrer travels through the stirring cycle. The temperature measurement signals are transmitted to an electronic signal process system by an FM/FM telemetry system. The processing system uses the temperature signals together with an analog stirrer position signal, taken from a position transducer disposed to measure the stirrer position to compute the vertical location of the ash zone upper boundary. The circuit determines the fraction of each total stirrer cycle time the stirrer-derived bed temperature is below a selected set point, multiplies this fraction by the average stirrer signal level, multiplies this result by an appropriate constant and adds another constant such that a 1 to 5 volt signal from the processor corresponds to a 0 to 30 inch span of the ash upper boundary level. Three individual counters in the processor store clock counts that are representative of: (1) the time the stirrer temperature is below the set point (500° F.), (2) the time duration of the corresponding stirrer travel cycle, and (3) the corresponding average stirrer vertical position. The inputs to all three counters are disconnected during any period that the stirrer is stopped, eliminating corruption of the measurement by stirrer stoppage.

5 Claims, 7 Drawing Figures

ASH LEVEL METER FOR A FIXED-BED COAL GASIFIER

BACKGROUND OF THE INVENTION

This invention relates generally to electronic measuring systems and more specifically to an ash level meter for a fixed-bed coal gasifier.

In the operation of a fixed-bed coal gasifier, it is necessary to maintain the ash level at the prescribed elevation. If the level drops too low, grate burnout is likely to occur. If the level rises above a nominal optimum height, then the devolatilization, gasification, and fire zones become shortened with subsequent loss of conversion efficiency and over temperature at the gasifier outlet. To control the ash level, the grate is rotated at a speed/duty rate such as to maintain the nominal ash level, but control is dependent upon the availability of a dependable and relatively accurate means of measuring the ash level.

It has been the practice to provide thermocouples in the arm of the bed stirrer to monitor the temperature profile of the gasifier bed. The motion of the stirrer is such that a helical scan of the bed temperature is produced. Since the stirrer both rotates and reciprocates, the signals from the thermocouples are transmitted by an FM/FM telemetry system. The availability of the bed temperature signal makes it attractive as a means for determining the ash level. Thus, there is a need for a means of determining the ash level from the existing temperature signals from a fixed bed coal gasifier.

SUMMARY OF THE INVENTION

In view of the above need, it is an object of this invention to provide an ash level meter for a fixed-bed coal gasifier which uses the bed temperature scan information from the bed stirrer to obtain the ash level measurement.

Further, it is an object of this invention to provide an ash level meter as in the above object wherein the ash level measurement is independent of the stirrer vertical travel rate.

Another object of this invention is to provide an ash level meter as in the above objects which does not give erroneous readings due to stoppage of the stirrer vertical travel.

Additional objects, advantages, and novel features of the invention will be set forth in part, in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

In summary, the ash level meter of this invention is for use in a fixed-bed coal gasifier having a bed stirrer which travels vertically through at least the ash zone of the bed. A means carried by the stirrer is provided for measuring the temperature profile of the ash zone as the stirrer moves vertically through the ash zone and generates a temperature signal whose amplitude is proportional to the temperature along the ash zone. A means is provided to measure the stirrer vertical position and provide a corresponding vertical positive signal. The temperature signal is compared with a set point temperature value corresponding to approximately the mid point temperature between the lower elevation of the ash zone at the grate level and the fire zone. Three individual counter circuits are provided to store counts representative of: (1) the time the stirrer temperature is below the set point temperature (value X), (2) the time duration of the corresponding stirrer vertical cycle (value Y), and (3) the corresponding average stirrer vertical position (value Z) obtained by converting the position signal to a proportional frequency signal and counting the frequency signal cycles. A processor circuit means responsive to the X, Y, and Z signals generates an output signal L proportional to the ash level in accordance with the following equation:

$$L = K_1(X/Y)(Z/Y) + K_2,$$

where $K_1$ and $K_2$ are calibration constants.

Further, circuitry is provided for resetting the counter circuits during each cycle of the stirrer travel.

Circuitry is provided to inhibit all three counter circuits during any period that the stirrer is stopped, eliminating corruption of the ash level measurement by stirrer stoppages.

BRIEF DESCRIPTION OF THE DRAWINGS

The accompanying drawings, which are incorporated in and form a part of the specification, illustrate an embodiment of the present invention, and together with the description, serves to explain the principles of the invention.

DETAILED DESCRIPTION

Figure 1:
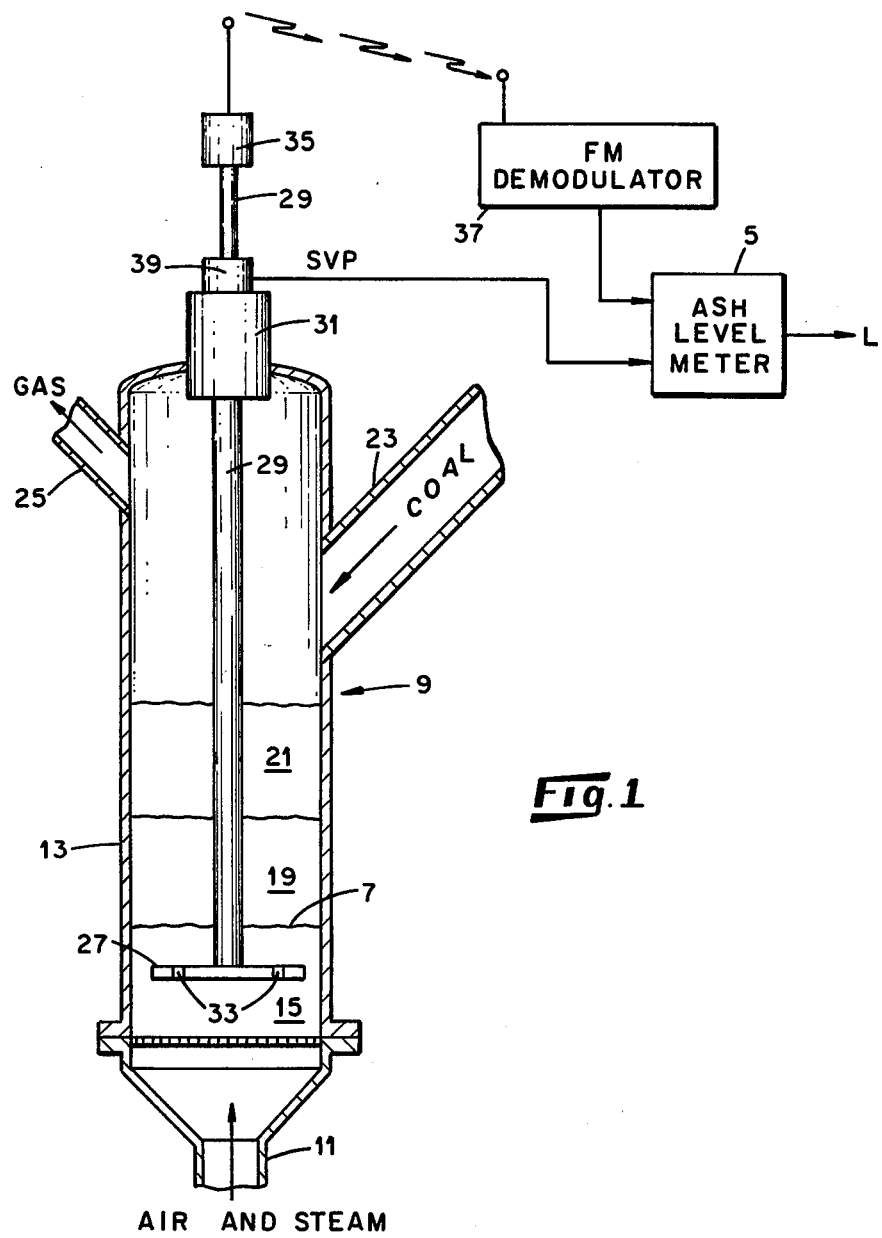
FIG. 1 is a schematic diagram of an ash level measuring system for a fixed-bed coal gasifier according to the present invention.

Referring now to FIG. 1, there is shown an ash level meter 5 for use in monitoring the ash level 7 of a fixed-bed coal gasifier 9. The gasifier 9 is of conventional design, wherein air mixed with steam to support combustion is introduced through a bottom inlet 11 of a cylindrical containment housing 13. A grate 15 supports the bed above the inlet 11. The bed includes an ash zone immediately above the grate, followed by a combustion zone 19 and a layer of coal 21 above the combustion zone. Coal is fed into the gasifier through a conduit 23 and the product gas is taken off through a gas exit conduit 25.

The bed is continuously agitated by means of a stirrer 27 attached to a stirrer post 29. A stirrer drive mechanism 31 engages the post 29 at the top of the gasifier to both rotate and reciprocate the stirrer 27. The stirrer travels from just above the grate 15 to a point normally above the combustion zone 19 and back with a travel cycle of about 15 minutes. The stirrer also rotates at a rate of 0.5 revolutions/min. while traveling up and down in the 15 minute cycle. The bed temperature profile in the ash zone approximates the relatively cold (200° to 300° F.) steam/air mixture blown up into the bed past the grate 15 at the bottom to that of the fire zone (1000° to 2000° F.) with a thin interface of large temperature gradient between the two zones. Thermocouples 33 carried by the stirrer 27 are used to measure the bed temperature as the stirrer moves through the bed.

Leads to the thermocouples extend up through the stirrer post 29 to an FM transmitter 35 carried atop the stirrer post. Because the stirrer both rotates and reciprocates, the signals are transmitted by an FM/FM telemetry system. The FM modulated signal is detected by an FM receiver and demodulator 37. The output of the demodulator 37 is connected to one input of the ash level meter 5. This signal varies between −5 volts and +5 volts corresponding to a temperature range of 0° to 2500° F.

To measure the position of the stirrer a position transducer 39, such as a cable operated, spring return potentiometer is mounted atop the stirrer drive and engages the post 29. The transducer 39 provides a stirrer vertical position signal (SVP) to an input of the meter 5, The SVP signal varies between 1 and 5 volts for a range of stirrer elevation of just above the grate to a level 72" above the grate, the extent of vertical travel of the stirrer 27. Normally, the range of vertical travel used is about 36 inches (starting just above the grate) for a 42-inch bed gasifier as illustrated here.

Figure 2:
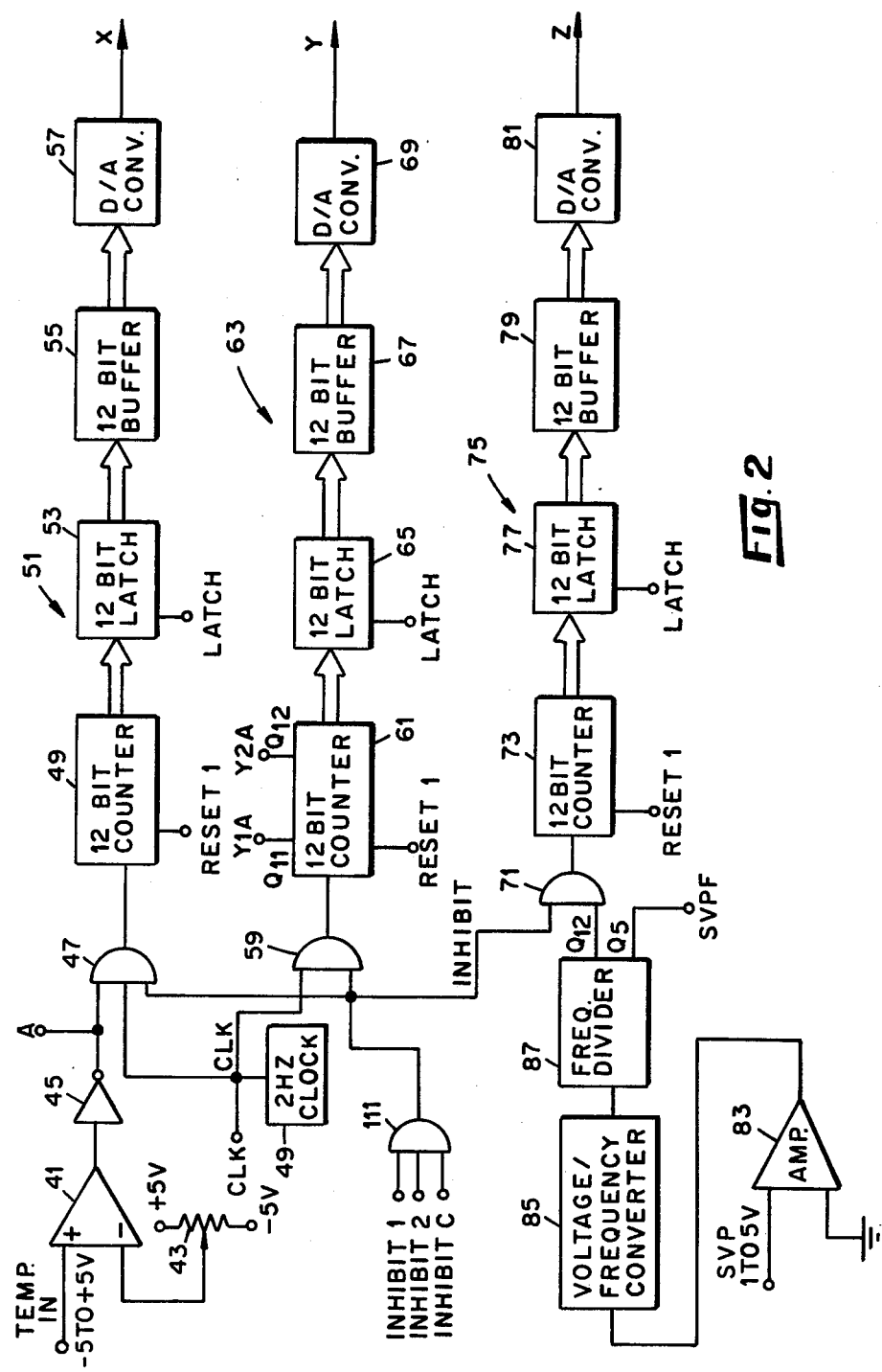
FIG. 2 is a schematic block diagram of the counting circuits of the ash level meter of FIG. 1.

Referring now to FIG. 2, it will be seen that the temperature signal is applied to the non-inverting (+) input of a comparator 41. The inverting input (−) of the comparator is connected to the adjustable arm of a potentiometer 43 which is connected between a +5 and −5 voltage source. The potentiometer 43 allows an operator to select the temperature set point corresponding to the temperature of the mid point of the ash zone 17.

The output of comparator 41 is connected through an inverter 45 to one input of an AND gate 47. A 2 Hz clock pulse source 49 is connected to a second input of AND gate 47. The clock pulses are applied to the count input of a 12 bit binary counter 49 when the signal A is "high". The signal A is high as long as the measured temperature signal to the + input of comparator 41 is less than the set point signal applied to the − input. The counter 49 is part of a first counting circuit 51 which includes the counter 49, a 12 bit latch circuit 53 connected to the corresponding 12 stages of the binary counter 49, a 12 bit buffer driver circuit 55 connected to the corresponding latch stages and a digital-to-analog (D/A) converter 57 connected to the buffer 55. The converter 57 output is an analog signal (X) which is proportional to the count registered by the counter 49 when a LATCH signal is generated and applied to the latch control input of the latch 53.

The clock signal is also applied through an AND gate 59 to the count input of a 12-bit binary counter 61 of a second counting circuit 63. This counting circuit includes a latch 65, buffer 67 and D/A converter 69 in identical arrangement to that of the first counting circuit 51. The analog output (Y) is proportional to the counts registered by the counter 61 during a full travel cycle of the stirrer.

The SVP signal is applied to the input of an amplifier 83 which drives a voltage-to-frequency converter 85 where the SVP signal amplitude is converted to a pulse train having a frequency proportional to the SVP's amplitude. The output of the converter 85 is connected to the input of a divider 87. One output from the divider 87 divides the pulse frequency input by 4096, to provide the proper pulse train frequency through an AND gate 71 to the count input of a 12-bit binary counter 73 of a third counting circuit 75. This counting circuit includes a latch 77, buffer 79 and D/A converter 81 in identical arrangement to that of counter circuits 51 and 63. The analog output signal Z is proportional to the counts registered by the counter 73 during a travel cycle of the stirrer which is indicative of the average stirrer position.

Figure 3:
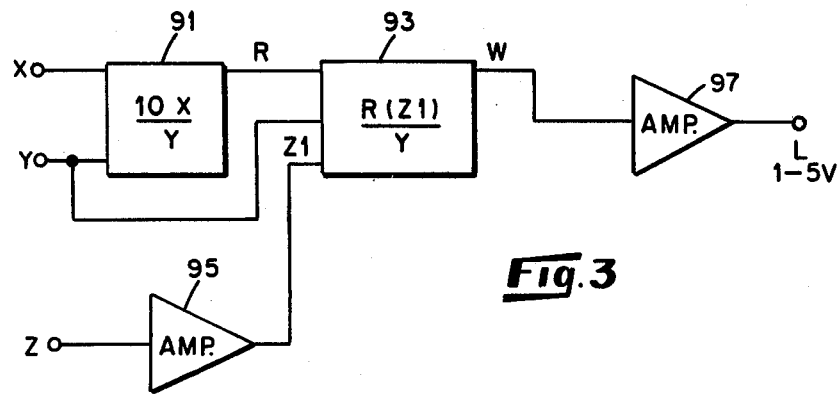
FIG. 3 is a schematic block diagram of the signal processor circuit portion of the ash level meter which generates a signal proportional to the ash level from the three counter circuit signals of FIG. 2.

The X, Y, and Z signals are applied to inputs of a signal processor circuit shown in FIG. 3. The signals X and Y are applied to separate inputs of a divider 91 so that the output signal R=(X/Y). The R, Y and Z signals are applied to separate inputs of a multifunction converter 93. The Z signal is amplified by an amplifier 95 in series with the Z input to a value of $K_1(Z)$ so that the output (W) of converter 93 is $W=K_1(X/Y)(Z/Y)$. The W signal is then amplified by an output amplifier 97 to provide the ash level signal $L=K_1(X/Y)(Z/Y)+K_2$. This signal (L) varies between 1 and 5 volts corresponding to a 0 to 30-inch span of the ash zone upper boundary level.

The divider 91 and converter 93, may be commercially available integrated circuit modules, such as the Burr-Brown Models 4291 and 4302, respectively, from Burr-Brown Research Corporation, Tucson, Ariz.

The measurement L is based on determining the fraction of each total stirrer cycle time that the stirrer is below a selected set point (X/Y), as selected by the potentiometer 43, typically 500° F. for this example, and multiplying this fraction by the average stirrer position (Z/Y). The calibration constants $K_1$ and $K_2$ provide the desired voltage range of the output signal L.

In operation, the 2 Hz clock signal advances counter 49 during the time that the temperature is below the set point of comparator 41 and advances counter 61 during the full stirrer cycle time (15 minutes). The counter 73 stores the average vertical position per cycle of the stirrer by counting the pulses from the divider 87. The divider 87 is a 12-bit counter and each time the 12th bit ($Q_{12}$) is set, dividing by 4096, counter 73 advances one count. This provides a range of counts consistant with the counts registered by the other counters during a stirrer cycle. The voltage-to-frequency converter 85 varies from 0-10 KHz corresponding to 0-72 inches of stirrer vertical travel. During a normal cycle, the stirrer only travels 36 inches.

To latch the registered counts in the counters 49, 61, and 73, the "low" going A signal transition which inhibits AND gate 47 is applied to the trigger input of a monostable multivibrator (MV) 101. MV 101 generates a 10μ sec pulse which is applied through an OR gate 103 to the trigger input of an MV 105. This MV generates a 1μs pulse which is applied through an AND gate 107 to the latch input of latch circuits 53, 65, and 77. Simultaneously, an MV 109 is triggered for 1 millisecond to generate an INHIBIT-1 pulse, which is a low going pulse applied to one input of a count inhibiting AND gate 111 (FIG. 1) to prevent counting during the LATCH and RESET-1 signals. RESET-1 is generated by applying the pulse from the MV 105 to the trigger input of an MV 113. MV 113 generates a 10μ sec delay and triggers an MV 115 when it times out. The output of MV 115 is a 1μ sec pulse (RESET-1) which is applied to the reset inputs of counters 49, 61, and 73. Thus, it will be seen that when the signal A goes low the counters 49, 61, and 73 are inhibited from counting for 1 millisecond while the registered counts are latched and the counters are reset. The outputs of latches 53, 65, and 77 are converted to analog equivalents X, Y, and Z in D/A converters 57, 69 and 81, and the L signal output of the processor circuit (FIG. 3) is updated.

Figure 4:
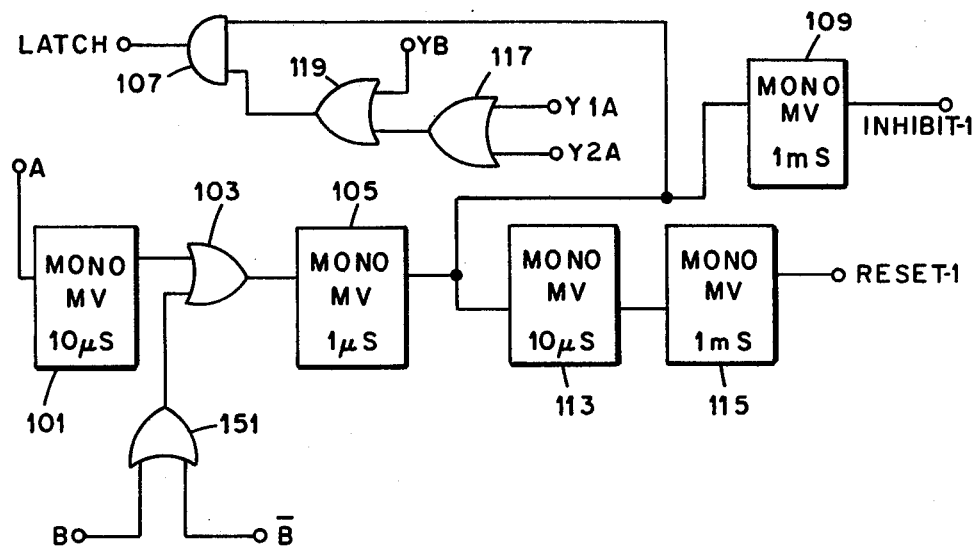
FIG. 4 is a schematic block diagram of the latch and reset signal generating portion of the ash level meter.

Referring again to FIG. 4, the latch signal may be inhibited during an abnormal automatic stirrer cycle to avoid erroneous ash level measurement. The ash level data collected in counters 49, 61, and 73 is prevented from being used by inhibiting AND 107 to prevent the passage of the LATCH signal. An OR gate 117 is connected to the $Q_{10}$ (Y2A) and the $Q_{11}$ (Y1A) stages of the counter 61. If the registered count in counter 61 has not reached the count level to switch either stage $Q_{10}$ or $Q_{11}$, both Y2A and Y1A will be low, causing the output of OR gate 117 to be low. This output is applied to one input of an OR gate 119 whose output is connected to one input of AND gate 107. The low signal through OR gate 119 from gate 117 will inhibit AND gate 107 from passing the LATCH signal.

Figure 5:
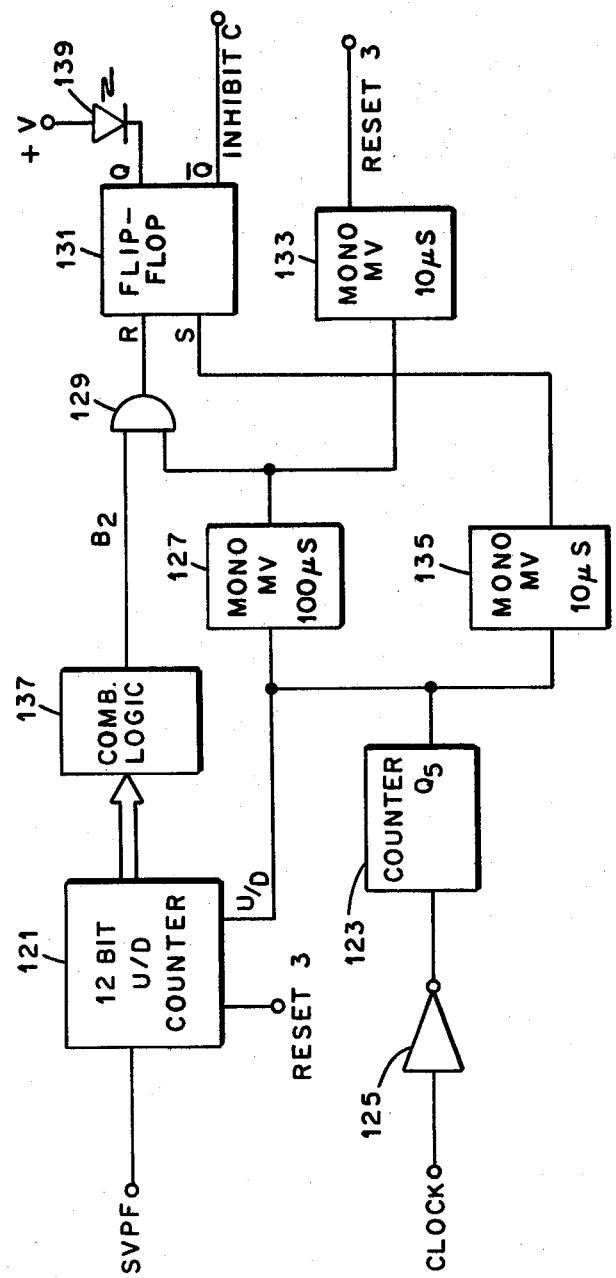
FIGS. 5 and 6 are schematic block diagrams of circuitry which monitors the movement of the stirrer to inhibit the counters of FIG. 2 when the stirrer is stopped or during an abnormally long stirrer cycle.

In order to inhibit counting during a period when the stirrer is stopped, an INHIBIT-C signal is provided at an input to AND gate 111 (FIG. 1). INHIBIT-C is derived by the circuitry shown in FIG. 5. This circuitry detects whether or not the stirrer is moving vertically and sets the state of INHIBIT-C accordingly. This circuit uses the frequency output SVPF of frequency divider 87. The $Q_5$ stage (SVPF) output is connected to the count input of an up-down counter 121. The SVPF signal is a pulse train having a frequency equal to the output frequency of voltage-to-frequency converter 85 (FIG. 2) divided by $2^5$. The counter 121 is switched to count up for 8 seconds and down for 8 seconds by connecting the U/D control input to the $Q_5$ stage output of a 12-bit binary counter 123. The counter is connected to receive the clock pulses (CLK) from the 2 Hz clock 49 (FIG. 2) through an inverter 125. Thus, the $Q_5$ output changes states every 8 seconds. This output is also connected to a 100μ sec MV 127 whose output is connected through an AND gate 129 to the reset input of a flip-flop 131 and to the input of a 10μ sec MV 133. MV 133 generates a 10μ sec (RESET 3) pulse which is applied to the reset input of U/D counter 121 to reset counter 121 at the end of each up-down counting cycle. Further, the $Q_5$ output of counter 133 is connected to a 10μ sec MV 135 whose output is connected to the set input of flip-flop 131. During normal operation, stirrer moving, flip-flop 131 is set and reset when MV 127 times out at the end of the down count.

A combinational logic circuit 137 is connected to compare the registered up and down counts of counter 121. If the net count following an up-down count cycle is not greater than 0±1, indicating that the stirrer has stopped, the output of the logic circuit 137 goes low (B2). This output is connected to an input of AND gate 129. The B2 signal prevents the pulse from MV 127 from resetting flip-flop 131 causing the reset output ($\bar{Q}$) of flip-flop 131 to remain low, thereby generating INHIBIT-C. An LED lamp 139 may be connected to the Q output of flip-flop 131 so that it is turned "on" when the flip-flop 131 remains in the set state to indicate to an operator that the stirrer has stopped.

Figure 6:
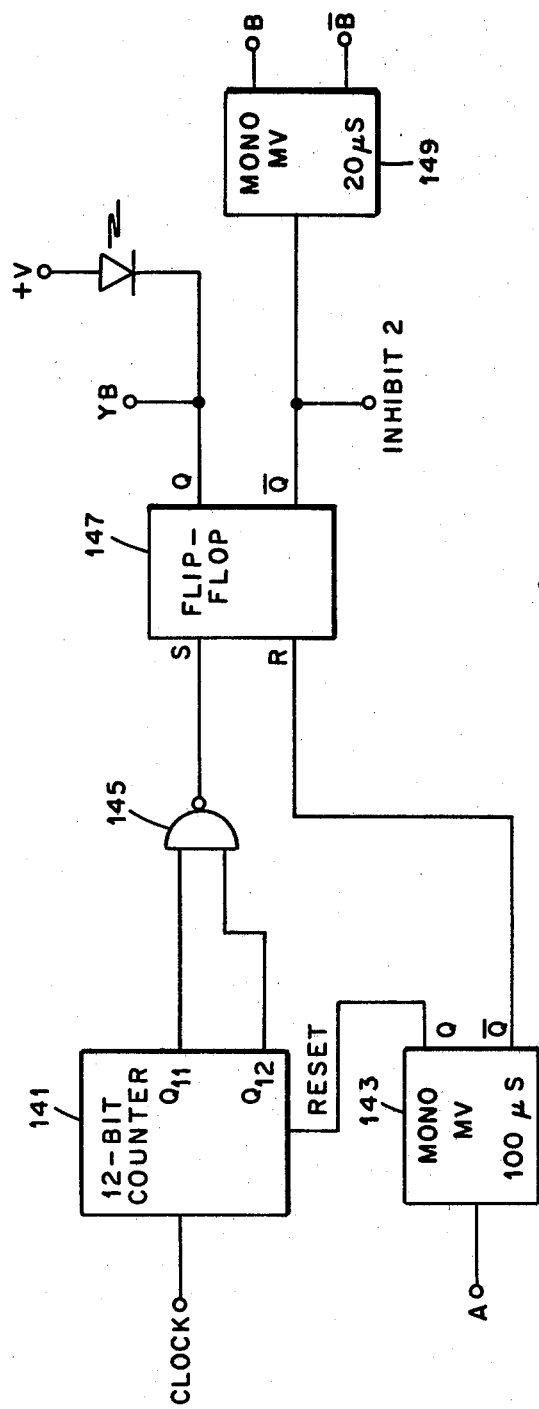

Referring now to FIG. 6, an INHIBIT-2 signal may be generated and applied to one input of AND gate 111 (FIG. 2) to prevent counters 49, 61, and 73 from counting when the period between consecutive negative transitions of signal A exceeds 25.6 minutes, indicating a malfunction in the stirrer travel cycle. The CLK signal is applied to the input of a 12-bit binary counter 141. The A signal is applied to the input of a 100μ sec MV 143 which is set when the A signal goes low, causing the set output (Q) to go high. The Q output is connected to the reset input of counter 141 to reset the counter each time signal A goes low. During normal operation (15 min. stirrer cycle), the counter 141 will not count a sufficient number of pulses to cause both stages $Q_{11}$ and $Q_{12}$ to be high. However, if the counter is allowed to count for a period of 25.6 minutes without being reset, both stages $Q_{11}$ and $Q_{12}$ will go high. Thus, the $Q_{12}$ and $Q_{11}$ stages are connected to NOR gate 145 whose output is connected to the set input of a flip-flop 147 so that when the output of gate 145 goes low, both inputs high, flip-flop 147 is set. The Q output of flip-flop 147 goes low generating the INHIBIT-2 signal.

Further, the INHIBIT-2 signal triggers an MV 149 which causes its set output (B) to go high for 20μ sec. This signal is applied to one input of an OR gate 151 (FIG. 4) to generate a RESET-1 signal to reset the counters 49, 61, and 73 to zero. The high signal (YB) at the Q output of flip-flop 147 is applied to one input of OR gate 119 (FIG. 4) to allow a LATCH signal to be generated by the presents of the high signal (B) applied to the MV 105 through OR gates 151 and 103. This provides the same latch and reset action for the counting circuit, as explained for the application of the low A signal to the input of MV 101. However, since it is desirable to display a zero ash level reading under this condition, the reset signal ($\bar{B}$) is also fed to MV 105 through gates 151 and 103 to generate another latch operation. Remembering that the counters 49, 61, and 73 have been reset to 0 count by signal B, the latch signal will provide a zero count for the X, Y, and Z signals producing L=0 for the ash level measurement.

Thus, it will be seen that a very versatile ash level meter has been provided for measuring the ash level of a coal gasifier. This invention is particularly suited for fixed-bed gasifiers such as the 42-inch stirred gasifier at METC (Morgantown Energy Technology Center) Morgantown, W. Va. However, the method is applicable to a wide range of multi-zone stirred reactors where interface levels must be measured and/or controlled. The variable sensed for ash level measurement in the METC gasifier is bed temperature, but in other applications temperature or some other appropriate variable may be utilized such as permittivity, conductivity, density, viscosity, etc. The unique features of this invention are the techniques to prevent corruption of the ash measurement when subjected to severe conditions such as:

(1) Stirrer scans up to 72 inches vertical, twice the normal 36-inch scan.

(2) Stirrer stoppages for unlimited periods at any point in the scan cycle.

(3) Changes in stirrer vertical travel rates either up or/and down.

(4) Abnormally long or short stirrer scan times.

With these refinements, the ash level measurement system possesses the unadulterated high quality for use in automatic control of the ash level in a coal gasifier.

Figure 7:
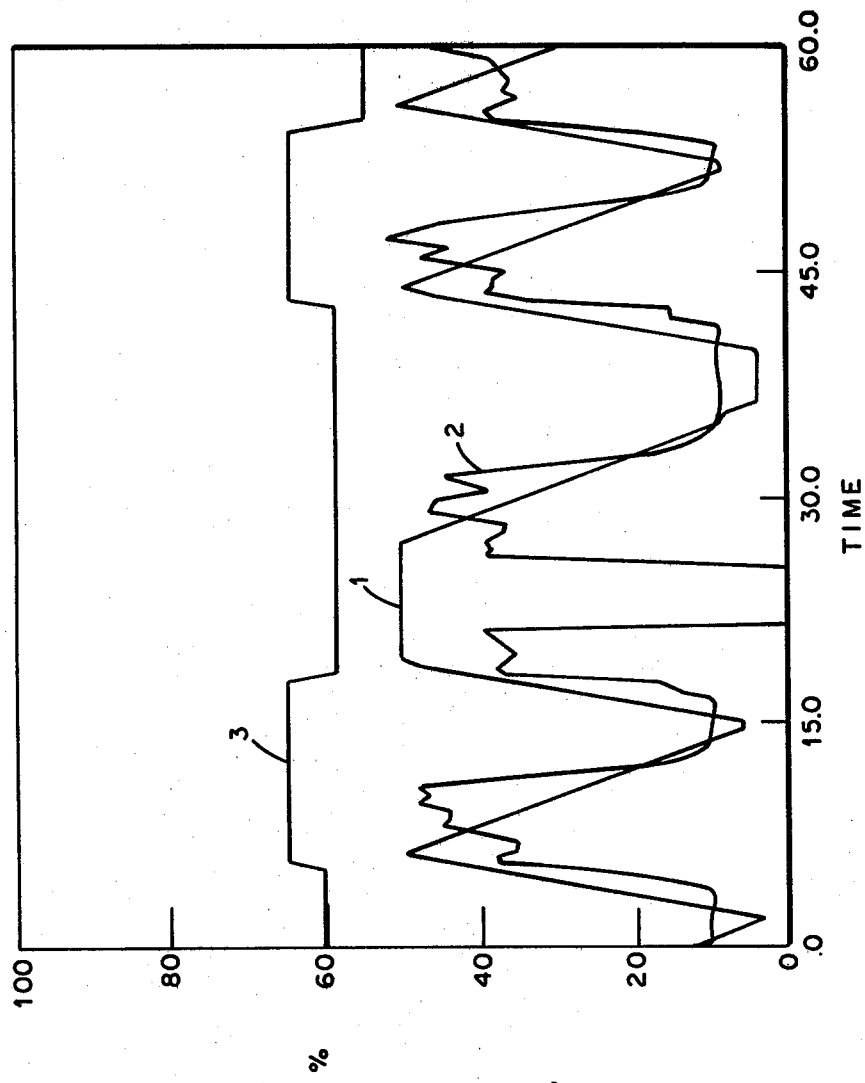
FIG. 7 is a multiple axis plot wherein plot 1 is the vertical position of the gasifier (scale 0–72 inches), plot 2 is the stirrer arm temperature from a thermocouple carried by the arms (scale 0°–2,000° F.), and plot 3 is the output of the ash level meter (scale 0–30 inches)

The ash level meter was tested successfully on the METC gasifier. FIG. 7, Plot 3, is a sample of its response. Plot 1 is the stirrer vertical position while Plot 2 is the bed temperature from a thermocouple mounted in the stirrer arm. It can be seen that an update of the ash level signal occurs at the times when the bed temperature, Plot 2, crosses 500° F. (25 percent) in the increasing direction. It should be noted that the stirrer was stopped several times and that for several of the stirrer cycles the stirrer did not reach the 0 inch (0 percent) lower travel limit but that the ash measurement was not affected.

The foregoing description of a preferred embodiment of the invention has been presented for purposes of illustration and description. It is not intended to be exhaustive or to limit the invention to the precise form disclosed, and obviously many modifications and variations are possible in light of the above teaching. The embodiment was chosen and described in order to best explain the principles of the invention as its practical application to thereby enable others skilled in the art to best utilize the invention in various embodiments and with various modifications as are suited to the particular use contemplated. It is intended that the scope of the invention be defined by the claims appended hereto.

What is claimed is:

1. In combination with a fixed-bed coal gasifier having a bed stirrer which travels vertically through at least an ash zone of the bed of said gasifier, an ash level meter, comprising:

temperature measuring means carried by said stirrer for measuring the temperature profile of said ash zone as said stirrer moves vertically through said ash zone and generating a temperature signal whose amplitude is proportional to the temperature along said ash zone;

a comparator circuit means for comparing said temperature signal from said temperature measuring means with a preselected set point temperature signal and providing a first signal output state when said temperature signal amplitude is less than said set point temperature signal and a second signal output state when said temperature signal exceeds the amplitude of said set point temperature signal;

a clock signal generator for generating preselected frequency clock pulses;

a first counting means responsive to the state of the output signal from said comparator means for counting said clock pulses for a period when said comparator output is in said first state and generating an output signal X proportional to the counts registered by said first counting means;

a second counter means for counting said clock pulses for a period equal to the vertical travel period of said stirrer and generating a signal Y proportional to the counts registered by said second counter means;

means for detecting the stirrer vertical position and generating output pulses at a pulse repetition rate proportional to the vertical position of said stirrer;

a third counting means for counting said pulses from said stirrer vertical position detecting means and generating a signal Z proportional to the count registered by said third counting means; and a processor circuit means responsive to said X, Y, and Z signals for generating an output signal L proportional to the ash level in accordance with the following equation:

$$L = K_1(X/Y)(Z/Y) + K_2,$$

where $K_1$ and $K_2$ are calibration constants.

2. The combination as set forth in claim 1 wherein said stirrer reciprocally travels in a known cycle time through said ash zone and further comprising a reset circuit means for resetting said first, second and third counter means once during each cycle of travel of said stirrer.

3. The combination as set forth in claim 2 further comprising means responsive to said clock pulses and said pulses from said stirrer vertical position detecting means for detecting stoppage of vertical travel of said stirrer and inhibiting the application counter pulses to said first, second, and third counting means.

4. The combination of claim 3 further comprising means responsive to said clock pulses and the output state of said comparator means for detecting an abnormally long travel cycle of said stirrer and inhibiting the application of count pulses to said first, second and third counting means.

5. The combination of claim 2 wherein each of said counting means includes a binary counter connected to count the corresponding pulses applied to the input thereof, a latch circuit connected to latch the counts registered by said counter when a latch command signal is applied to an input thereof, a digital buffer driver and a digital-to-analog converter connected to the output of said buffer driver for generating analog signal values for the corresponding ones of said X, Y, and Z digital signals; and wherein said reset circuit means includes means for applying a latch signal to said latch input of each of said latches of said first, second, and third counting means prior to the application of said reset signal thereto.

* * * * *